United States Patent Office 3,209,027
Patented Sept. 28, 1965

3,209,027
ANHYDROUS AURAMINE SOLUTION AND
PREPARATION THEREOF
Rill Lewis Grosklos, Marietta, Ohio, assignor to American Cyanamid Company, Stamford, Conn., a corporation of Maine
No Drawing. Filed Nov. 7, 1962, Ser. No. 236,114
4 Claims. (Cl. 260—566)

This invention relates to and has for its object the provision of an improved dye composition and, more particularly, to the provision of a concentrated anhydrous solution comprising auramine base in acetic or propionic acid.

Auramine is a well-known dye of considerable commercial importance, especially as a paper colorant. It is generally marketed as a powder, e.g., as the hydrochloride. However, a commercially feasible auramine solution would be desirable. Liquids are simpler to measure on a large scale. They present no dusting problems. To this time, however, stable solutions of auramine have not been available. Known solutions of high auramine content decompose with formation of the ketone derivative and evolution of ammonia. Possibly, the decomposition results from the hydrolysis of the imino group in the auramine molecule occasioned by the presence of excessive water in the solution.

Attempts to obtain substantially anhydrous solutions of auramine for commerce have been, up until the present invention, abortive. Indirectly, this is because auramine is most easily isolated, and almost exclusively available, as the hydrochloride. Liberation of the base from its hydrochloride was accomplished by slurrying the latter with a strong base (normally aqueous caustic). The liberated solid base was separated from the main body of the slurry by filtration and then dried. It is the difficulty previously encountered during the drying operation which most directly interfered with the attainment of stable solutions of auramine base. Drying to very low water content, on a speedy, continuous, and large scale requires elevated temperatures, generally around 100° C. This is especially true in the last stages of drying when only a small percentage of the original water remains for removal. But the wet auramine solid at high temperatures decomposes so rapidly and substantially as to rule out its use in any commercial operation where yields, purity of product, and costs, are critical. Since dry auramine base could not be feasibly obtained and wet auramine base could not form storage stable solutions, auramine, as stated above, is presently available only in the form of its solid hydrochloride.

It is an object of the present invention to provide a commercially feasible process for drying wet auramine to a water content of 0.5% by weight or less. It is another object of the present invention to provide a concentrated storage stable solution of auramine base in glacial acetic acid or anhydrous propionic acid. Other objects will be apparent upon a consideration of the following detailed description of the invention.

The foregoing objects are met by the present invention in a simple, though effective, manner. This is made possible by the discovery that auramine can be obtained in a substantially pure anhydrous form, i.e., with a water content of less than 0.5% by weight, by a simple two-step drying process which comprises drying the wet auramine at a temperature of about 60° C. or below, preferably below, until the water content is about 1% or below, and raising the temperature of the resulting auramine to a range of about 80° to about 100° C. until water content is below 0.5%. This process gives the desired dried auramine base.

In the complete conversion of auramine hydrochloride to the anhydrous auramine base, the hydrochloride is contacted with aqueous alkali containing at least about 1.5 moles of strong inorganic base, e.g., potassium or sodium hydroxide for each mole of the hydrochloride. Preferably more inorganic base, for example, about 4.5 to 6.5 moles thereof, is employed for each mole of the hydrochloride. Contact is effected at ambient temperature or lower, but, in no event, should the temperature be permitted to go above 50° C. and, preferably, for a superior product, should be maintained at 30° C. or below. The liberated solid base which results may be separated from the slurry by conventional means such as filtration, decantation, centrifugation, and then washed to remove substantially all traces of alkali. Immediately upon completion of the wash step, the auramine base is subjected to the drying process as described above. Dried auramine which has been obtained by the foregoing process, is eminently suitable for preparation of stable auramine solutions. Such solutions can be prepared to have high auramine base content, for example, about 30% by weight or even higher of said base. Glacial acetic acid solutions having an auramine base content of about 45 weight percent have been prepared, which solutions have remained relatively stable over many weeks of storage. Because of commercial availability, this acid is preferred, but propionic acid can be instead used for the preparation of auramine solutions of the present invention.

The following examples are presented for the purpose of further illustrating the present invention. Therein, parts are expressed on a weight basis.

EXAMPLE 1

To an aqueous slurry of auramine hydrochloride is added gradually with stirring, an aqueous solution of 25% sodium hydroxide, using about 4.5 moles of sodium hydroxide for each mole of auramine hydrochloride. During addition of the base, the temperature is kept below 30° C. When the auramine base has been completely liberated from its hydrochloride and the addition of the caustic is complete, the solid auramine base precipitate is immediately isolated by filtration and quickly washed with water to completely remove all free alkali.

The base presscake is then dried at about 60° C. to a water content of about 1%; and then dried at a temperature of about 100° C. to a water content of less than 0.5%.

The dried base is then stirred in glacial acetic acid at 25–30° C. to a complete solution, using about 63 parts of glacial acetic acid for each 38 parts of dry auramine base.

A sample of the solution stored in a cool atmosphere (2–5° C.) was still stable and satisfactory after months of storage. At room temperature, only a slight loss in strength was observed.

EXAMPLE 2

Following the procedure of Example 1, a solution of auramine base in propionic acid was prepared. This showed similar resistance to decomposition upon storage for extended periods.

EXAMPLE 3

Following the procedure of Example 1 except for the use of an equivalent amount of potassium hydroxide for the alkali employed therein, a stable auramine solution is obtained.

I claim:
1. A process of preparing a substantially anhydrous auramine solution which comprises dissolving auramine base having a water content of less than 0.5 percent by weight in an anhydrous lower alkanoic acid of two to three carbon atoms, said solution containing from about 30 to about 45 percent by weight of auramine.

2. The process of claim 1 wherein the acid is glacial acetic acid.

3. A solution comprising a lower alkanoic acid of two to three carbon atoms and from about 30 to about 45 weight percent of auramine base, said solution containing less than 0.5 percent water based on the auramine content thereof.

4. The solution of claim 3 wherein the alkanoic acid is glacial acetic acid.

References Cited by the Examiner

Hellerman et al.: J.A.C.S., vol. 68, 1890–1893 (1946).
Kolling et al.: Anal. Chem., vol. 31, pp. 1876–1879 (1959).

CHARLES B. PARKER, *Primary Examiner.*